United States Patent
Kerkes et al.

(10) Patent No.: US 12,538,173 B2
(45) Date of Patent: Jan. 27, 2026

(54) METHODS AND APPARATUS TO DETERMINE VIRTUAL WIFI DATA RATE

(71) Applicant: The Nielsen Company (US), LLC, New York, NY (US)

(72) Inventors: Joseph Kerkes, Lutz, FL (US); Julio Villasante, Tampa, FL (US); Marko Panger, Skofije (SI)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 18/675,245

(22) Filed: May 28, 2024

(65) Prior Publication Data

US 2024/0314635 A1    Sep. 19, 2024

Related U.S. Application Data (63) Continuation of application No. 17/976,703, filed on Oct. 28, 2022, now Pat. No. 12,004,008, which is a continuation of application No. PCT/US2021/029939, filed on Apr. 29, 2021, which is a continuation of application No. 16/864,101, filed on Apr. 30, 2020, now Pat. No. 11,496,925.

(51) Int. Cl.
| | |
|---|---|
| *H04W 28/06* | (2009.01) |
| *H04L 1/1607* | (2023.01) |
| *H04W 72/0446* | (2023.01) |
| *H04W 72/0453* | (2023.01) |
| *H04W 84/12* | (2009.01) |

(52) U.S. Cl.
CPC ........... *H04W 28/06* (2013.01); *H04L 1/1614* (2013.01); *H04W 72/0446* (2013.01); *H04W 72/0453* (2013.01); *H04W 84/12* (2013.01)

(58) Field of Classification Search
CPC ............ H04W 28/06; H04W 72/0446; H04W 72/0453; H04W 84/12; H04W 88/04; H04W 28/0958; H04W 28/12; H04L 1/1614
See application file for complete search history.

(56) References Cited

U.S. PATENT DOCUMENTS

| | | | |
|---|---|---|---|
| 2006/0215572 A1* | 9/2006 | Padhye | H04L 43/0858 370/252 |
| 2015/0092697 A1* | 4/2015 | Yeow | H04L 5/0055 370/329 |
| 2015/0381690 A1* | 12/2015 | Schmidt | H04L 65/70 709/231 |
| 2018/0160160 A1* | 6/2018 | Swaminathan | H04N 21/816 |

* cited by examiner

*Primary Examiner* — Thai Nguyen (57) ABSTRACT

Methods, apparatus, systems and articles of manufacture are disclosed to determine virtual WiFi data rate. An example disclosed herein includes a control frame receiver to capture control frames from a user device. The example disclosed herein further includes a bitrate calculator to calculate a bitrate for each control frame by dividing a bitmap of a control frame by an amount of time between the control frame and a previously captured control frame. The example disclosed herein further includes an interval timer to control a length of time that the control frames are captured before calculating the virtual bandwidth. The example disclosed herein further includes a virtual bandwidth calculator to calculate the virtual bandwidth after the length of time, the virtual bandwidth calculated by dividing an average bitrate from the control frames by the length of time.

20 Claims, 8 Drawing Sheets

```
..... .... 0000 = FRAGMENT NUMBER: 0
1000 1010 0110 .... = SEQUENCE NUMBER: 2214
QOS CONTROL: 0X0000
     .... .... .... 0000 = TID: 0
     [.... .... .... .000 = PRIORITY: BEST EFFORT (BEST EFFORT) (0) ]
     .... .... ...0 .... = EOSP: SERVICE PERIOD
     .... .... .00. .... = ACK POLICY: NORMAL ACK (0X0)
     .... .... 0... .... = PAYLOAD TYPE: MSDU
     0000 0000 .... .... = QAP PS BUFFER STATE: 0X00
     .... .... ...0 .... = BUFFER STATE INDICATED: NO
```

FIG. 3A

```
COMPRESSED BLOCKACK RESPONSE
BLOCK ACK CONTROL: 0X0005
     .... .... .... ...1 = BA ACK POLICY: SENDER DOES NOT REQUIRE IMMEDIATE
ACKNOWLEDGEMENT
     .... .... .... .010. = BA TYPE: COMPRESSED BLOCKACK (0X2)
     .... .... 0000 000. .... = RESERVED: 0X00
     0000 .... .... .... = TID FOR WHICH A BASIC BLOCKACK FRAME IS REQUESTED: 0X0
BLOCK ACK STARTING SEQUENCE CONTROL (SSC): 0X8A60
     .... .... .... 0000 = FRAGMENT: 0
     1000 1010 0110 .... = STARTING SEQUENCE NUMBER: 2214
BLOCK ACK BITMAP: FF7F000000000000
```

FIG. 3B

| | SSN | TIME (S) | TOTAL TIME (S) | COUNT (BITMAP) | TOTAL COUNT | BITRATE |
|---|---|---|---|---|---|---|
| BLOCK ACK FRAME | 2047 | 0 | 0 | 0 | 0 | 0 |
| BLOCK ACK FRAME | 2054 | 1 | 1 | 7 | 7 | 10500 B/S |
| BLOCK ACK FRAME | 2069 | 2 | 3 | 15 | 22 | 10500 B/S |
| BLOCK ACK FRAME (RE-TRANSMISSION) | 2068 | 1 | - | -1 | 22 | - |
| BLOCK ACK FRAME | 2074 | 1 | 4 | 5 | 27 | 7500 B/S |
| BLOCK ACK FRAME | 2098 | 2 | 6 | 30 | 57 | 22500 B/S |
| ... | ... | | | | ... | |

METHODS AND APPARATUS TO DETERMINE VIRTUAL WIFI DATA RATE

CROSS REFERENCE TO RELATED APPLICATIONS

This patent is a continuation of U.S. patent application Ser. No. 17/976,703, filed on Oct. 28, 2022 and granted as U.S. Pat. No. 12,004,008, which is a continuation of International Application No. PCT/US21/29939, filed on Apr. 29, 2021, and titled "METHODS AND APPARATUS TO DETERMINE VIRTUAL WIFI DATA RATE," which is a continuation of U.S. patent application Ser. No. 16/864,101, filed Apr. 30, 2020, and granted as U.S. Pat. No. 11,496,925. U.S. patent application Ser. No. 17/976,703; International Patent Application No. PCT/US21/29939; and U.S. patent application Ser. No. 16/864,101 are hereby incorporated herein by reference in their respective entireties. Priority to U.S. patent application Ser. No. 17/976,703; International Patent Application No. PCT/US21/29939; and U.S. patent application Ser. No. 16/864,101 is hereby claimed.

FIELD OF THE DISCLOSURE

This disclosure relates generally to data rates, and, more particularly, to methods and apparatus to determine virtual WiFi data rate.

BACKGROUND

Audience measurement entities (AMEs) may track user access to digital media to determine viewership information. Some viewership data may be collected through the use of WiFi data rates. For example, the WiFi data rate may be transmitted by network devices to an AME via one or more networks. Information from the WiFi data rate is processed by the AME to determine useful digital media exposure data and associated statistics.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In some examples, audience measurement entities (AME's) acquire digital media viewership data through collecting streaming data from households. In examples disclosed herein, streaming data is digital media accessed through the Internet that may be collected through a streaming meter connected to a household's network. In some examples, a streaming meter produces data rate measurements (bandwidth usage) of devices on a household network. In some examples, the data rate measurements are used to determine the probability that a particular device is streaming internet content. In some examples, the data rate measurement is achieved by capturing WiFi packets, accumulating the size of the packets, and mathematically dividing the size by capture duration (time). However, there are various factors that can cause this measurement process to be inaccurate or to fail completely (e.g., the mode of communication between the device and router access point (A/P) is not compatible with the streaming meter or the meter sensitivity is not sufficient, etc.). Other example situations in which bandwidth cannot be accurately measured by the streaming meter include incompatible spatial streams, incompatible level of quadrature amplitude modulation (QAM), low radio frequency (RF) sensitivity due to distance or obstructions, and other interferences (e.g., adjacent radio signals). Even though in these examples, actual bandwidth measurement collected by the streaming meter are obscured, an approximate bandwidth may be inferred by observing other artifacts in the WiFi signals.

In the original Institute of Electrical and Electronics Engineers (IEEE) 802.11 specification for local access network (LAN) protocols, every frame required a positive acknowledgment. Each transmission was not complete until an acknowledgment was received. However, streaming data is generally collected in bursts, for example, a user watching a video from the internet will send out a request and receive a flurry of packets carrying the video frames. The original conception of the 802.11 specification required that each frame sent to a receiver needed to be acknowledged separately. However, the quality-of-service extensions developed in the 802.11e specification brought in block acknowledgments (BlockAck), which allowed a sender to transmit a stream of frames and have them all acknowledged at once. The BlockAck mechanism allowed improvements to channel efficiency by aggregating several acknowledgments into one frame. Examples disclosed herein use the BlockAck mechanism for determining WiFi bandwidth measurements.

In some examples, a device on a household network receives frames of data via the Internet. In some examples, the device sends an acknowledgement frame to indicate the frames were received. In some examples, the data frames are sent at a high bitrate, while the acknowledgment frame is sent at a low bitrate so that all devices are able to receive it. In some examples, a streaming meter is able to capture all of the frames and aggregates the frames sizes to calculate bandwidth. However, in examples disclosed herein, the streaming meter is unable to receive the data frames due to the situations described above. Examples disclosed herein are able to receive the BlockAck frames since they are sent at a lower bitrate. Examples disclosed herein parse details from the BlockAck frame to determine the information of the data frames that were acknowledged by the BlockAck frame.

Examples disclosed herein determine if high bandwidth utilization is taking place (e.g., if a user device is streaming) even when the data frames are not seen by the streaming meter. Examples disclosed herein determine a virtual bandwidth using Control Frames (BlockAck Frames) to determine the delivery of data frames. Examples disclosed capture the Control Frames and determine the frames that originate at the user device and are delivered to the household (HH) A/P. In examples disclosed herein, the Control Frames contain a starting sequence number (SSN) for the data frames being acknowledged and the bitmap recording of how many packets that were successfully acknowledged by the station (STA). As used herein, virtual bandwidth is defined to be an estimate of the bandwidth taking place on the STA based on the collection of these control features.

In examples disclosed herein, the virtual bandwidth is tracked and reported for each individual device on a household network at five minute intervals. However, other time intervals may additionally and/or alternatively be used to track and report virtual bandwidth. An example of a bandwidth event generated when determining the virtual bandwidth in examples disclosed herein may be represented by:

<BandwidthEvent sequence="3872" timestamp="2019-09-12T14:30:50Z"
macAddress="B8:A1:75:0C:15:2E" startTime="2019-09-12T14:25:47Z"
duration="303" band="Wi-Fi (H)"
actualBandwidth="1,0,1,1,1,1,1,206,496,462,1,1,1, . . . "
virtualBandwidth="5,0,3,4,3,5,13,213,266, 130,1,4, 1,3, . . . "/>

The event attributes of examples disclosed herein have the same meaning as the corresponding attributes in other streaming events. For example, the timestamp is the coordinated universal (UTC) time when the event was reported, the sequence is the event sequence number, the media access control address (MAC Address) is the operational display and input development (ODID), the startTime is the UTC start time of the event, and the duration is the duration (in seconds) of the event. In examples disclosed herein, the band is the band that the event is recorded on, the actualBandwidth is the CSV list of actual bandwidth (bandwidth based on packet size) usage in 5-second segments, and virtualBandwidth is the CSV list of virtual bandwidth (bandwidth based on Block-Ack mechanism) usage in 5-second segments.

Examples disclosed herein determine virtual bandwidth estimates from streaming meter data, even when such streaming data packets are not visible to the streaming meter.

Examples disclosed herein capture control frames to calculate an estimated bandwidth for a user device on a household network. Examples disclosed herein determine the probability that a user device is streaming digital media based on the estimated bandwidth.

Figure 1:
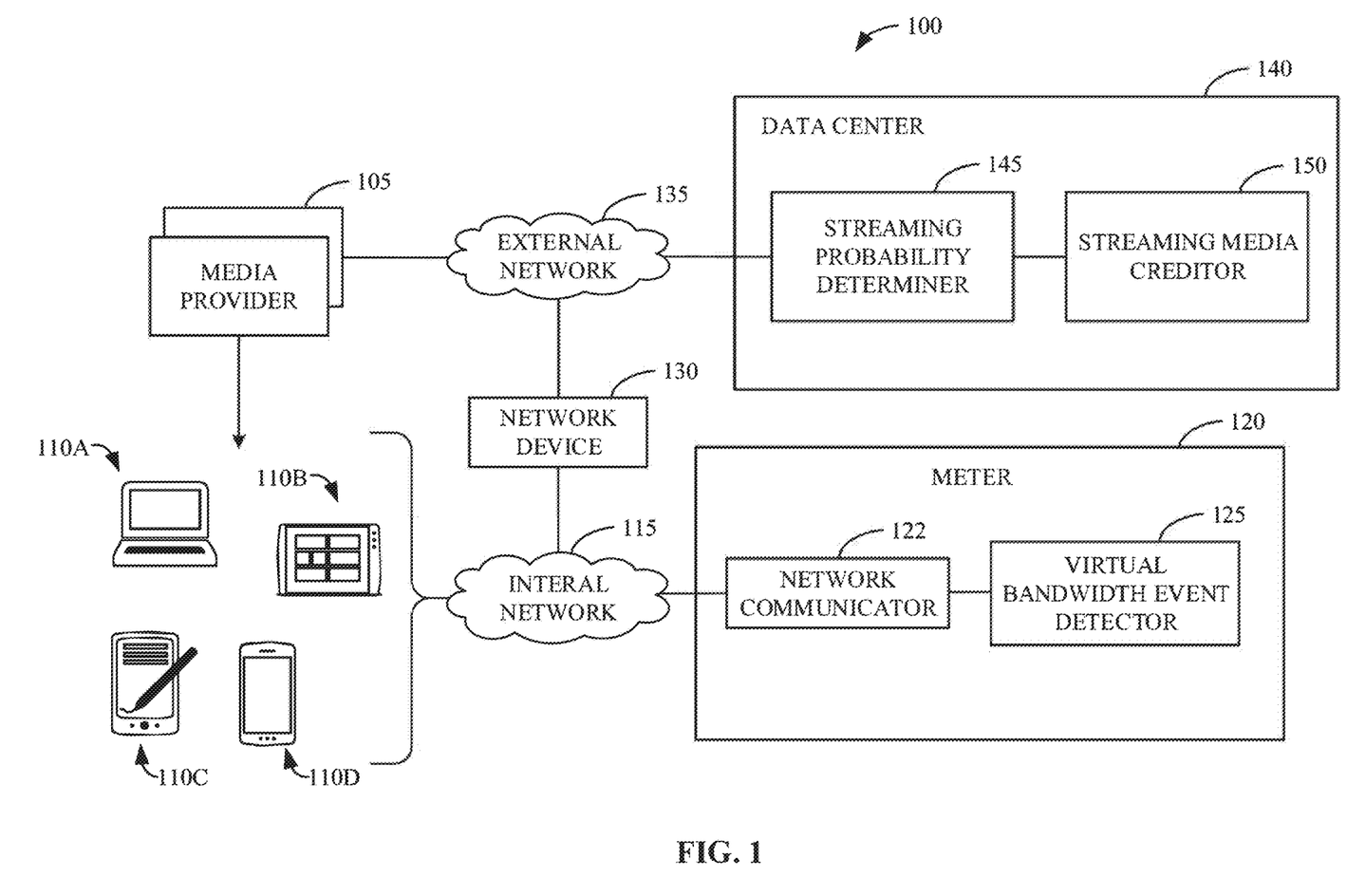
FIG. 1 illustrates an example environment in which an example virtual bandwidth event detector detects virtual bandwidth events in accordance with teachings disclosed herein.

FIG. 1 illustrates an example environment 100 in which an example virtual bandwidth event detector 125 detects virtual bandwidth events in accordance with teachings disclosed herein. The example environment 100 of FIG. 1 includes an example media provider 105, example user device(s) 110A, 110B, 110C, 110D, an example internal network 115, an example meter 120, an example network device 130, an example external network 135, and an example data center 140. The example meter 120 includes an example network communicator 122 and an example virtual bandwidth event detector 125. The example data center 140 includes an example streaming probability determiner 145 and an example streaming media creditor 150.

In the illustrated example of FIG. 1, the example media provider 105 provides the user device(s) 110A, 110B, 110C, 110D with digital media. The example media provider 105 transmits data packets containing requested media to the example user device(s) 110A, 110B, 110C, 110D. The example media provider 105 obtains the digital media data via the example external network 135. The example media provider 105 is implemented as a server hosting an application such as, for example, YouTube. However, the example media provider 105 can be implemented as any other computing system hosting any application or combinations of applications that are able to provide digital media.

The example user device(s) 110A, 110B, 110C, 110D of the illustrated example of FIG. 1 are used to access and view different digital media. The example user device(s) 110A, 110B, 110C, 110D send a request message for desired media to an access point in the example internal network 115. The example user device(s) 110A, 110B, 110C, 110D receive packets containing the requested media data from the example media provider 105 and display the media to a user. The example user device(s) can be implemented with any device or combinations of devices that able to connect to media such as, for example, a smart television (TV), a personal computer, a smart phone, a tablet device, an Apple TV, a Roku device, YouTube TV, an Amazon fire device, etc., or any combination thereof.

The example internal network 115 of the illustrated example of FIG. 1 provides communication between the example user device(s) 110A, 110B, 110C, 110D, the example network communicator 122, the example meter 120 and the example network device 130. The example user device(s) 110A, 110B, 110C, 110D transmit the media request messages to the example media provider 105 via the external network 135 using the example internal network 115. The example user device(s) 110A, 110B, 110C, 110D also transmit control frames to the example internal network 115, and the example internal network 115 provides the control frames to the example meter 120 via the example network communicator 122. The example internal network 115 can be a network at a place of business, a home, etc. The example internal network 115 is implemented as a local area network (LAN). However, any other type of network may additionally and/or alternatively be used such as, for example, a wide area network (WAN), a wireless local area network (WLAN), a storage area network (SAN), etc.

The example network device 130 of the illustrated example of FIG. 1 provides communication between the example internal network 115 and the example external network 135. The example internal network 115 transmits media request messages to the example media provider 105 via the example external network 135 using the example network device 130. The example network device 130 is implemented as a network device such as, for example, a modem. However, any other network devices may additionally and/or alternatively be used.

The example external network 135 of the illustrated example of FIG. 1 provides communication between the example media provider 105, the example network device 130, and the example streaming probability determiner 145 in the example data center 140. The example media provider 105 accesses media that is requested by the example user device(s) 110A, 110B, 110C, 110D through the example network device 130 using the example external network 135. The example streaming probability determiner 145 accesses the virtual bandwidth measurements from the example virtual bandwidth event detector 125 in the example meter 120 through the example network device 130 using the example external network 135. The example external network 135 is a network provided by a service provider (e.g., an internet service provider (ISP)). The example external network 135 is implemented as a public network such as, for example, the Internet. However, any other type of networks (e.g., wireless, mobile cellular, etc.) which may be public or private, and any combination thereof may additionally and/or alternatively be used.

The example meter 120 of the illustrated example of FIG. 1 captures media data from the example user device(s) 110A, 110B, 110C, 110D. The example meter 120 collects media data that is presented on the example user device(s) 110A, 110B, 110C, 110D using the example network communicator 122 to be used by the example virtual bandwidth event detector 125. The example meter 120 is implemented by a logic circuit such as, for example, a processor. However, any other type of circuitry may additionally or alternatively be used such as, for example, one or more analog or digital circuit(s), logic circuits, programmable processor(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)), etc.

The example network communicator 122 of the illustrated example of FIG. 1 provides communication between the example internal network 115 and the example virtual bandwidth even detector 125. In some examples, the internal network 115 provides the control frames to the virtual bandwidth event detector 125 via the network communicator 122. In some examples, the virtual bandwidth event detector 125 provides virtual bandwidth events to the internal network 115 via the network communicator 122. The example network communicator 122 can be implemented as any network communication interface such as, for example, an ethernet port, a WiFi module, etc.

Figure 2:
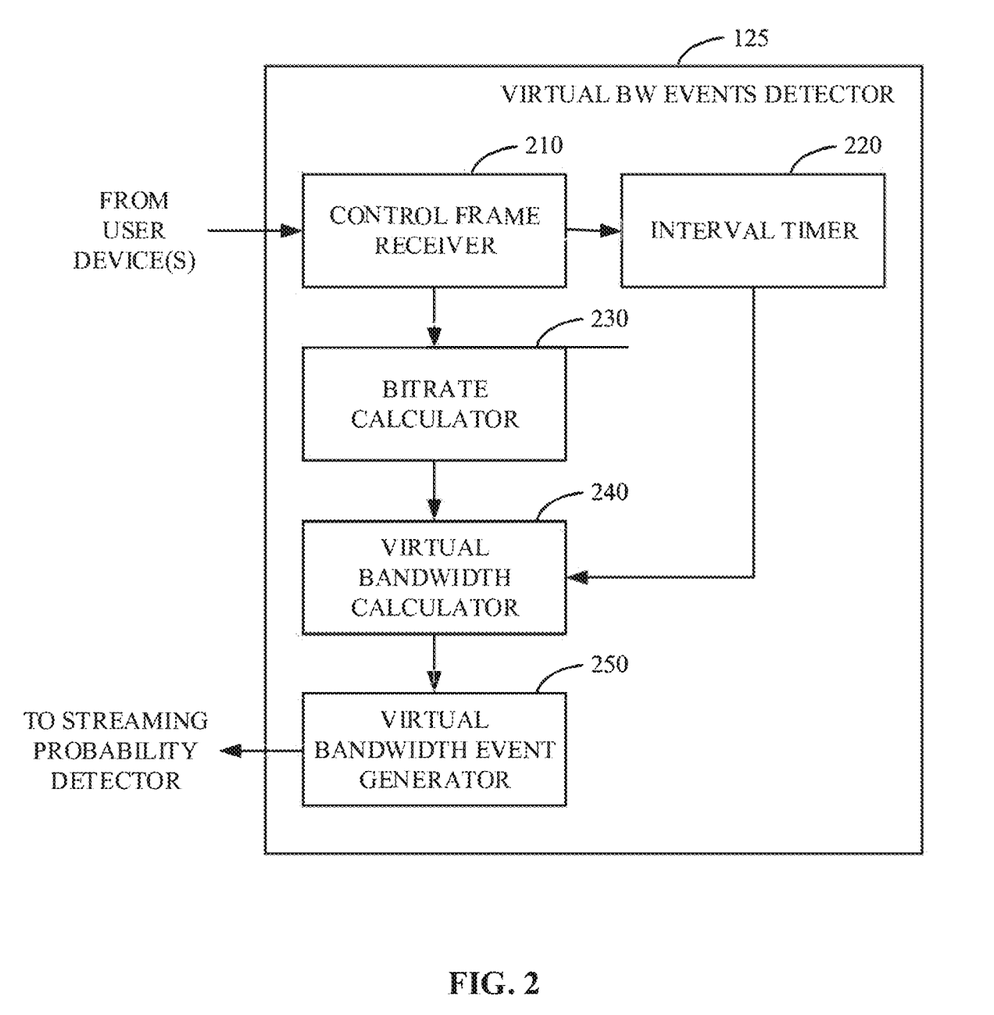
FIG. 2 is a block diagram representative of the example virtual bandwidth event detector of FIG. 1.

The example virtual bandwidth event detector 125 of the illustrated example of FIG. 1 is provided to calculate the virtual bandwidth of the example user device(s) 110A, 110B, 110C, 110D using control packet data received by the example internal network 115. The example virtual bandwidth event detector 125 parses the control packet data to use the data to calculate the virtual bandwidth over a period of time. In some examples, the period of time may be five minutes, however, any other lengths of the time may additionally and/or alternatively be used. The virtual bandwidth calculated by the example virtual bandwidth event detector 125 is used to generate bandwidth events when the virtual bandwidth meets a criterion such as, for example, the virtual bandwidth is above zero. However, other criteria may additionally and/or alternatively be used. The bandwidth events from the example virtual bandwidth event detector 125 are used by the example streaming probability determiner 145 to determine the likelihood that the example user device(s) 110A, 110B, 110C, 110D are streaming media. An example implementation of the virtual bandwidth event detector 125 is illustrated in FIG. 2, which is described in further detail below.

The example data center 140 of the illustrated example of FIG. 1 collects the virtual bandwidth events from the example external network 135. In some examples, the data center 140 is associated with an AME. In some examples, the data center 140 can be a physical processing center (e.g., a central facility of the AME, etc.). Additionally or alternatively, the data center 140 can be implemented via a cloud service (e.g., Amazon Web Services (AWS), etc.). The example data center 140 can further store and process virtual bandwidth events.

The example streaming probability determiner 145 is provided to determine the likelihood that the example user device(s) 110A, 110B, 110C, 110D are streaming digital media. The example streaming probability determiner 145 receives the virtual bandwidth data calculated by the example virtual bandwidth event detector 125 through the example network device 130 and the example external network 135. The example streaming probability determiner 145 uses the calculated virtual bandwidth to determine if the bandwidth is indicative of the example user device(s) 110A, 110B, 110C, 110D streaming media. The example streaming probability determiner 145 is implemented by a logic circuit such as, for example, a processor. However, any other type of circuitry may additionally or alternatively be used such as, for example, one or more analog or digital circuit(s), logic circuits, programmable processor(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)), etc.

The example streaming media creditor 150 uses the probability information from the example streaming probability determiner 145 to credit example user device(s) 110A, 110B, 110C, and 110D with streaming media. In some examples, the streaming media creditor 150 generates a report including streaming metrics that may be presented to the media provider 105.

FIG. 2 is a block diagram illustrating an example implementation of the example virtual bandwidth event detector 125 of FIG. 1. The example virtual bandwidth event detector 125 of FIG. 2 includes an example control frame receiver 210, an example interval timer 220, an example bitrate calculator 230, and example virtual bandwidth calculator 240, and an example virtual bandwidth event generator 250.

The example control frame receiver 210 of the illustrated example of FIG. 2 captures control frames (BlockAck frames) from the example user device(s) 110A, 110B, 110C, 110D through the example internal network 115. The example control frame receiver 210 determines if a captured control frame is from the user device(s) 110A, 110B, 110C, 110D (e.g., the control frame originated from the user device(s) 110A, 110B, 110C, 110D). The example control frame receiver 210 accesses the data from the control frames that are determined to be from the example user device(s) 110A, 110B, 110C, 110D such as, for example, the SSN, the bitmap, the amount of time since the last received control frame, etc. However, the example control frame receiver 210 may additionally and/or alternatively access other data from the control frames (e.g., the data seen in the example table 400 of FIG. 4 further discussed below). In some examples, the control frame receiver 210 implements means for capturing.

The example interval timer 220 of the illustrated example of FIG. 2 keeps track of the time period for determining the virtual bandwidth. The example interval timer 220 determines when a time period for determining the virtual bandwidth has elapsed. In examples disclosed herein, the time period is substantially five minutes. That is, the length of time may be any amount of time within thirty seconds of five minutes (e.g., within ten percent of five minutes). However, any other lengths of time may additionally and/or alternatively be used as the time period. The example interval timer 220 keeps track of the amount of time that the control frames are being captured before calculating the virtual bandwidth. In some examples, the interval timer 220 implements means for controlling.

The example bitrate calculator 230 of the illustrated example of FIG. 2 calculates the bitrate using the data in the captured control frames. The example bitrate calculator 230 uses the bitmap data and the amount of time since the last received control frame data from the control frame accessed by the example control frame receiver 210. In examples disclosed herein, the bitmap is the number of acknowledged data frames between the control frame and a previously captured control frame. The example bitrate calculator 230 divides the bitmap by the amount of time since the last received control frame to determine the bitrate for the control frame captured by the example control frame receiver 210. In some examples, the bitrate calculator 230 implements means for calculating.

The example virtual bandwidth calculator 240 of the illustrated example of FIG. 2 calculates the virtual bandwidth using the data from the control frames captured during the time period. The example virtual bandwidth calculator 240 determines the average bitrate from the control frames received in the time period. The example virtual bandwidth calculator 240 uses the bitrate data captured for each control frame by the example control frame receiver 210 and the amount of time of the time period that is determined by the example interval timer 220. The example virtual bandwidth calculator 240 sums the bitrates from the captured control frames and divides the sum by the total amount of control frames captured in the time period to determine the average bitrate. However, the example virtual bandwidth calculator 240 may additionally and/or alternatively use other averaging methods to determine the average bitrate. The example virtual bandwidth calculator 240 divides the average bitrate by the time period from the example interval timer 220 to determine the virtual bandwidth for the time period. In some examples, the virtual bandwidth event calculator 240 implements means for calculating.

The example virtual bandwidth event generator 250 of the illustrated example of FIG. 2 generates bandwidth events for the virtual bandwidths calculated by the example virtual bandwidth calculator 240. The example virtual bandwidth event generator 250 determines if the calculated virtual bandwidth is greater than zero. The example virtual bandwidth event generator 250 generates the bandwidth event when the virtual bandwidth calculated by the example virtual bandwidth calculator 240 is greater than zero. The example virtual bandwidth event generator 250 provides the bandwidth event to the example streaming probability determiner 145 of FIG. 1 to be used in determining the likelihood that the example user device(s) 110A, 110B, 110C, 110D are streaming media during each time period. In some examples, the virtual bandwidth event generator 250 implements means for generating.

Figure 3A:
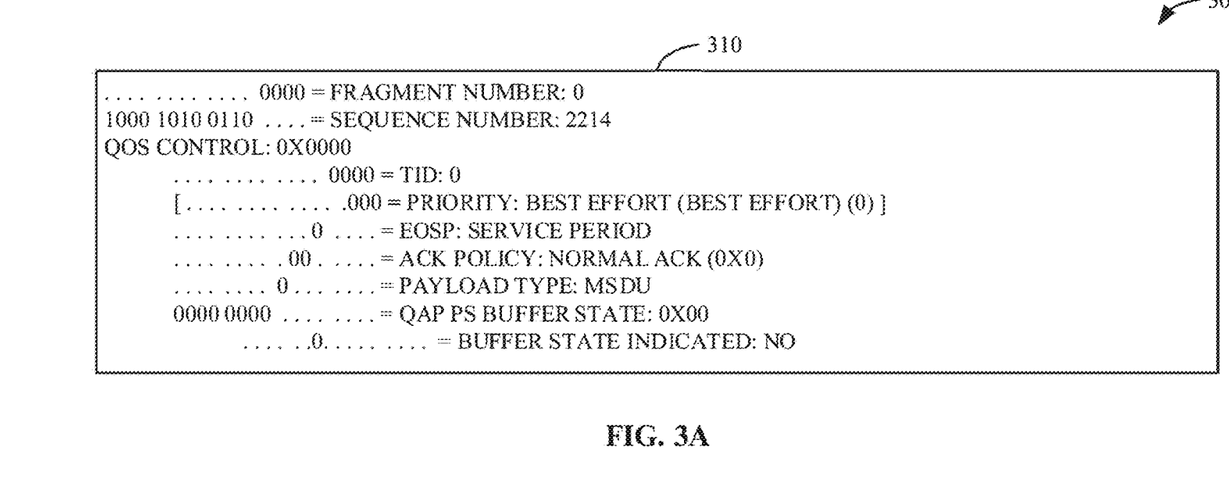
FIG. 3A is an example representation of a transmission message from a user device to a household (HH) access point (A/P).
Figure 3B:
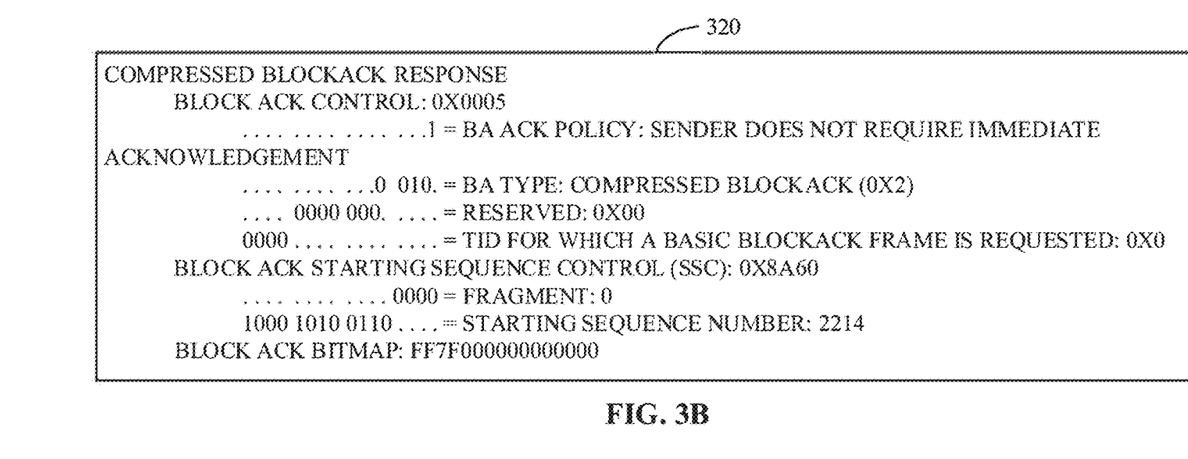
FIG. 3B is an example representation of a response message from the HH A/P to the user device.

FIGS. 3A and 3B are example representations of a transmission message 310 from user device(s) 110A, 110B, 110C, 110D to a household (HH) access point (A/P) in the example internal network 115 and an example representation of a response message 320 from the HH A/P in the example internal network 115 to the user device(s) 110A, 110B, 110C, 110D. In examples disclosed herein, the user device(s) 110A, 110B, 110C, 110D send quality of service (QoS) data frames in the transmission message 310 of FIG. 3A with a traffic identifier (TID) of 0 and the acknowledgment (ACK) policy of "normal ACK". In examples disclosed herein, the receiver in the internal network 115 will implicitly acknowledge (because of acknowledgement policy discussed above) with a BlockAck frame carrying the SSN that the user device(s) 110A, 110B, 110C, 110D sent and a bitmap that contains the received packets.

In examples disclosed herein, the bitmap along with the SSN indicates the packets that are being acknowledged by the example internal network 115, where each bit acknowledges one packet and the sequence number of the packet is equal to the starting sequence number plus the bit number. For example, as seen in the example response message 320 of FIG. 3B, the SSN of 2214 and the bitmap of FF7F000000000000 indicate that this example control (BlockAck) frame acknowledged 15 data frame packets from the user device(s) 110A, 110B, 110C, 110D successfully (number of set bits in bitmap). In examples disclosed herein, messages 310 and 320 are exchanged multiple times with the user device(s) 110A, 110B, 110C, 110D sending a several QoS data frames and the receiver on the internal network 115 acknowledging all of the QoS data frames in a single BlockAck frame.

Figure 4:
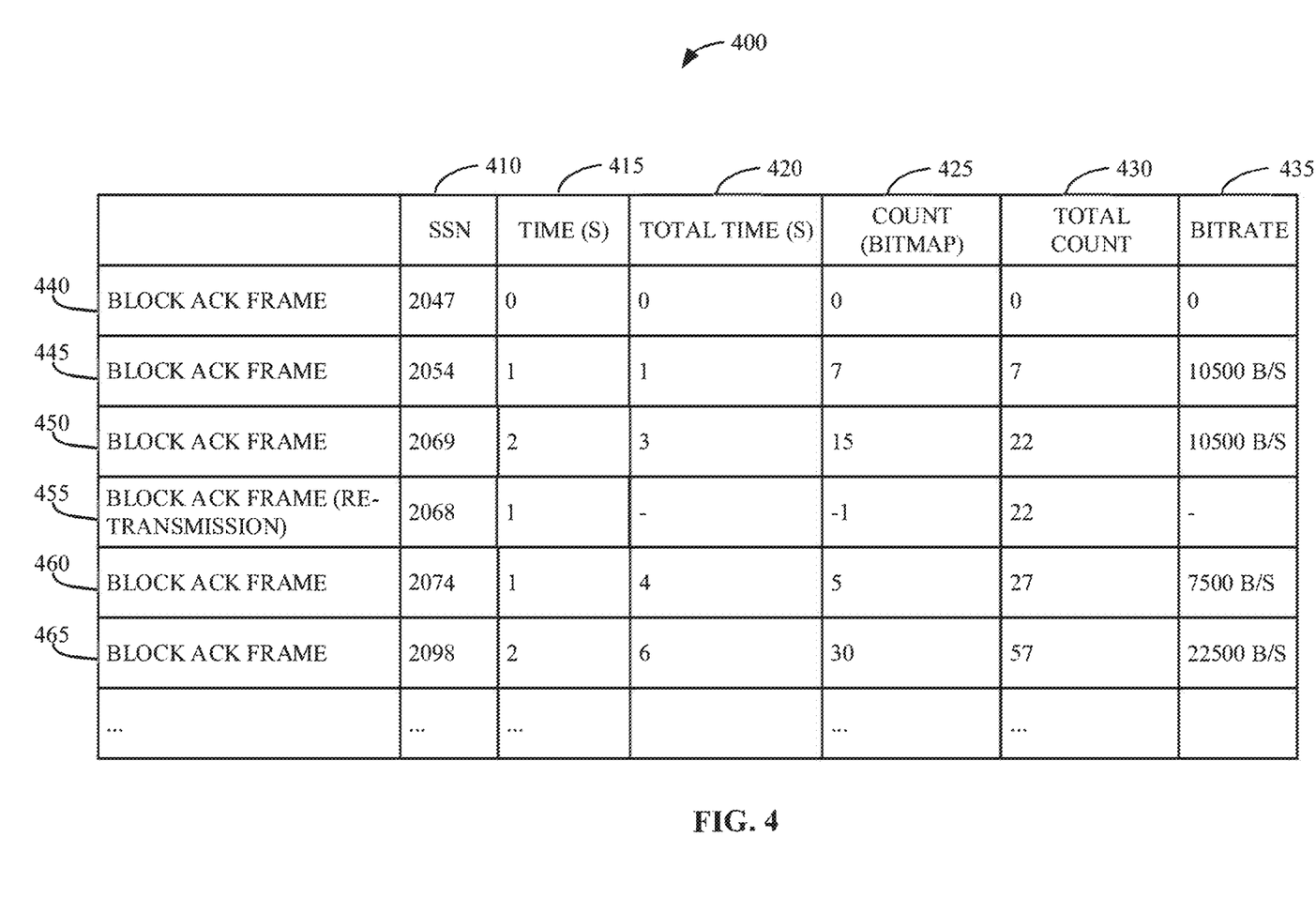
FIG. 4 is an example table representation of information determined by the example virtual bandwidth event detector of FIG. 1.

FIG. 4 is an example table representation of information determined by the example virtual bandwidth event detector 125 of FIG. 1. The example virtual bandwidth event detector 125 of FIG. 1 received control (BlockAck) frames and parses the information contained in each frame. The example virtual bandwidth event detector 125 of FIG. 1 also performs calculations to determine virtual bandwidth. The example Table 400 of FIG. 4 includes the information determined by the virtual bandwidth event detector 125 of FIG. 1. Example table 400 includes information from example BlockAck Frames 440-465. For each example BlockAck Frames 440-465 of FIG. 4, the example SSN 410, example time 415, example total time 420, count (bitmap) 425, total count 430, and bitrate 435 are determined.

In the example table 400 of FIG. 4, the example SSN 410 is the starting sequence number of the data packets being acknowledge by the BlockAck frame, the example time 415 is the time the BlockAck Frame was received, the example total time 420 is the time between two example BlockAck Frames 440-465, the example count 425 is the count of acknowledged frames between two Block Ack Frames, the example total count 430 is the total count of acknowledged frames in a given time period, and the example bitrate 435 is the example count 425 divided by the example time 415 multiplied by 1500 (1500 is the maximum transmission unit (MTU) in bytes. In examples disclosed herein, the example virtual bandwidth event detector 125 of FIG. 1 determine the virtual bandwidth by dividing the example bitrate 435 of FIG. 4 by the example total time 420 of FIG. 4 for incremental time periods. In examples disclosed herein, the virtual bandwidth is represented in Kilobytes/Seconds.

Figure 5:
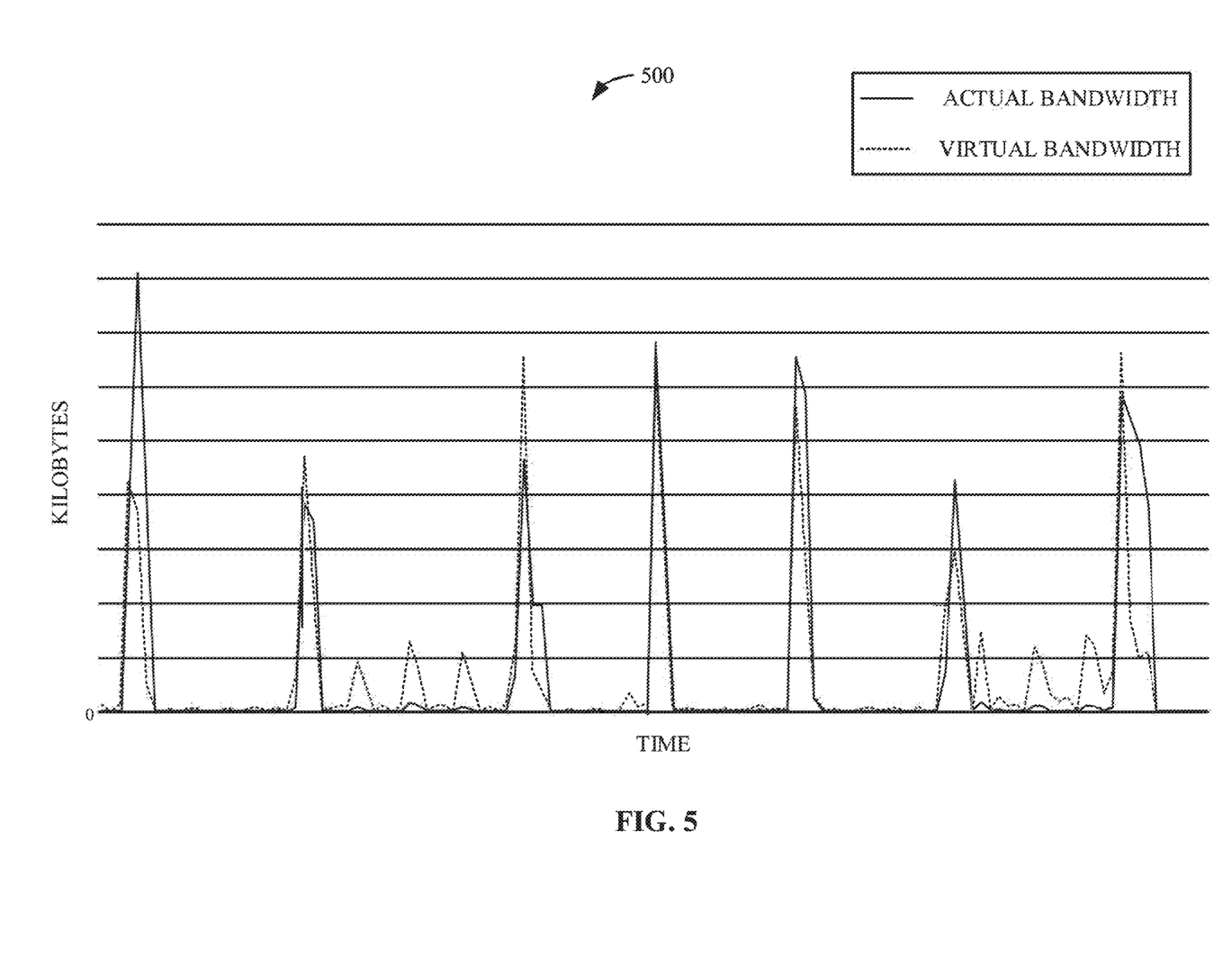
FIG. 5 is an example graph representation of a comparison between actual bandwidth based on packet sizes and virtual bandwidth based on the block acknowledgment mechanism in accordance with the teachings disclosed herein.

FIG. 5 is an example graph representation of a comparison between actual bandwidth based on packet sizes and virtual bandwidth based on the block acknowledgment mechanism in accordance with the examples disclosed herein. In the example graph 500 of FIG. 5, the virtual bandwidth data is collected using the example virtual bandwidth event detector 125 of FIG. 1. In the example graph 500 of FIG. 5, the actual bandwidth is represented as the solid line and the virtual bandwidth is represented as the dashed line. The example graph 500 displays the two bandwidths as Kilobytes over Time in seconds. The example graph 500 shows the differences in bandwidth measurements that are determined using the data packets that are received (actual bandwidth) and the estimated bandwidth measurements that are determined using the control frames (the virtual bandwidth determined by the example virtual bandwidth event detector 125 of FIG. 1).

While an example manner of implementing the virtual bandwidth event detector 125 of FIG. 1 is illustrated in FIG. 2, one or more of the elements, processes and/or devices illustrated in FIG. 2 may be combined, divided, re-arranged, omitted, eliminated and/or implemented in any other way. Further, the example control frame receiver 210, the example interval timer 220, the example bitrate calculator 230, the example virtual bandwidth calculator 240, the example virtual bandwidth event generator 250 and/or, more generally, the example virtual bandwidth event detector 125 of FIG. 1 may be implemented by hardware, software, firmware and/or any combination of hardware, software and/or firmware. Thus, for example, any of the example control frame receiver 210, the example interval timer 220, the example bitrate calculator 230, the example virtual bandwidth calculator 240, the example virtual bandwidth event generator 250 and/or, more generally, the example virtual bandwidth event detector 125 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example control frame receiver 210, the example interval timer 220, the example bitrate calculator 230, the example virtual bandwidth calculator 240, and/or the example virtual bandwidth event generator 250 is/are hereby expressly defined to include a non-transitory computer readable storage device or storage disk such as a memory, a digital versatile disk (DVD), a compact disk (CD), a Blu-ray disk, etc. including the software and/or firmware. Further still, the example virtual bandwidth event detector 125 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
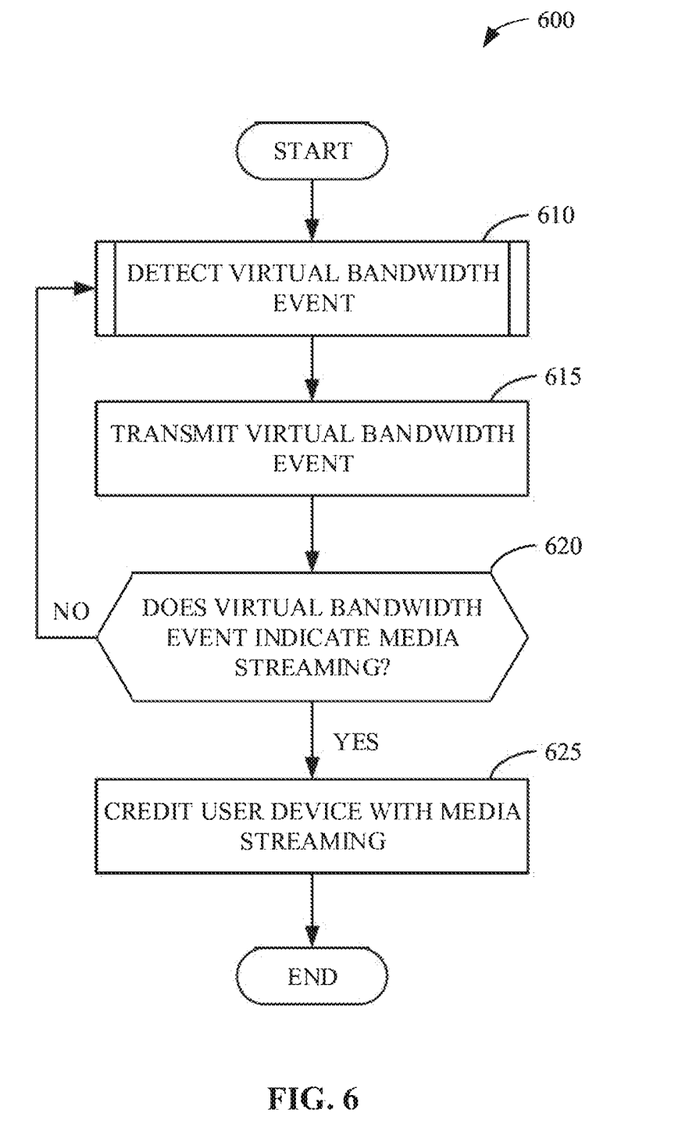
FIG. 6 is a flowchart representative of example machine-readable instructions which may be executed to implement an example meter and an example streaming probability determiner of FIG. 1.
Figure 7:
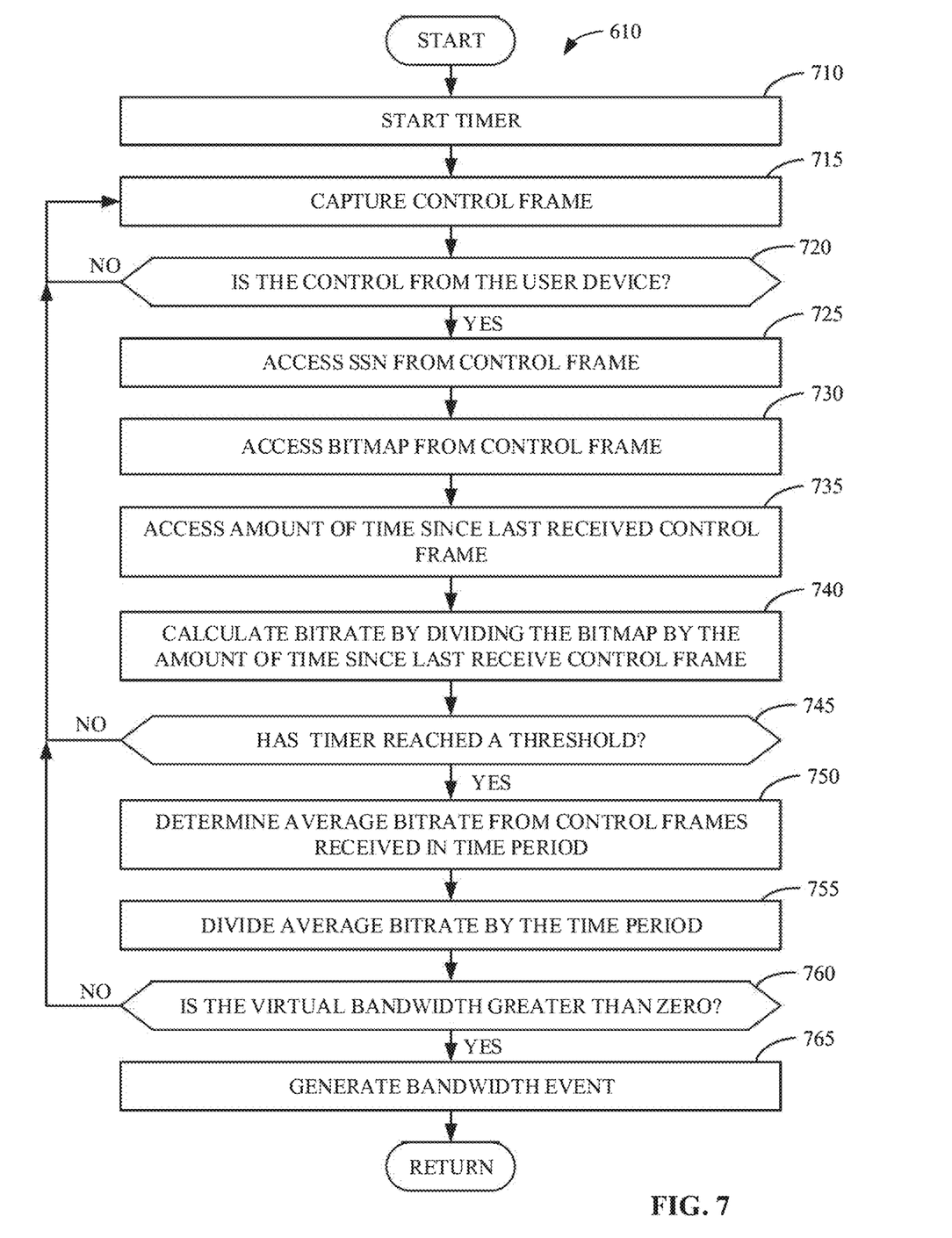
FIG. 7 is a flowchart representative of example machine-readable instructions which may be executed to implement the virtual bandwidth event detector of FIG. 1.

A flowchart representative of example hardware logic, machine readable instructions, hardware implemented state machines, and/or any combination thereof for implementing the virtual bandwidth event detector 125 of FIG. 2 is shown in FIGS. 6 and 7. The machine readable instructions may be one or more executable programs or portion(s) of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIGS. 6 and 7, many other methods of implementing the example virtual bandwidth event detector 125 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 6 and 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 6 is a flowchart illustrating example machine-readable instructions which may be executed to implement the example meter 120 and the example streaming probability determiner 145 of FIG. 1. The program of FIG. 6 begins execution at block 610 at which the example virtual bandwidth event detector 125 detects a virtual bandwidth event. The example virtual bandwidth event detector 125 calculates the virtual bandwidth of the example user device(s) 110A, 110B, 110C, 110D using control packet data received by the example internal network 115. As described in further detail below, the example flowchart 610 of FIG. 7 represents example instructions that may be implemented to detect a virtual bandwidth event.

At block 615, the example meter 120 transmits the virtual bandwidth event. The example meter 120 transmits the virtual bandwidth event to the example internal network 115 via the example network communicator 122. In some examples, the internal network 115 communicated the virtual bandwidth event from the meter 120 to the external network 135 via the network device 130. In some examples, the external network 135 provides the virtual bandwidth event to the streaming probability determiner 145.

At block 620, the example streaming probability determiner 145 determines if the virtual bandwidth event indicates media streaming. The example streaming probability determiner 145 receives the virtual bandwidth event from the example virtual bandwidth event detector 125 via the example network communicator 122, the example internal network 115, the example network device 130, and the example external network 135. The example streaming probability determiner 145 determines if the bandwidth of the virtual bandwidth event is indicative of the example user device(s) 110A, 110B, 110C, 110D streaming digital media. In some examples, the streaming probability determiner 145 determines if the bandwidth of the virtual bandwidth event is indicative of streaming media when the bandwidth exceeds a threshold. However, other methods of determining if the bandwidth of the virtual bandwidth event is indicative of streaming media may additionally and/or alternatively be used.

If the example streaming probability determiner 145 determines that the virtual bandwidth event does not indicate media streaming (e.g., block 620 returns a result of NO), then process 600 returns to block 610 at which the example virtual bandwidth event detector 125 detects a virtual bandwidth event. If the example streaming probability determiner 145 determines that the virtual bandwidth event indicates media streaming (e.g., block 620 returns a result of YES), then process 600 continues to block 625 at which the streaming media is credited. At block 625, the example streaming media creditor 150 credits the example user device(s) 110A, 110B, 110C, 110D of FIG. 1 with the media streaming. After block 624, process 600 ends.

FIG. 7 is an example process 610 that is representative of example machine-readable instructions which may be executed to implement the example virtual bandwidth event detector 125 of FIG. 2. The program of FIG. 7 begins execution at block 710 at which the example interval timer 220 starts a timer. At block 715, the example control frame receiver 210 captures a control frame (BlockAck). At block 720, the example control frame receiver determines if the control frame is from the example user device(s) 110A, 110B, 110C, 110D of FIG. 1. If the example control frame receiver 210 determines that control frame is from the example user device(s) 110A, 110B, 110C, 110D of FIG. 1

(e.g., block 715 returns a result of YES), control frame receiver 210 accesses the SSN from the control frame data. (Block 725). If the example control frame receiver 210 determines that the control frame is not from the example user device(s) 110A, 110B, 110C, 110D of FIG. 1 (e.g., block 720 returns a result of NO), the example control frame receiver waits to capture a new control packet (returns to block 715).

At block 730, the example control frame receiver 210 accesses the bitmap from the control frame data. At block 735, the example control frame receiver 210 accesses the amount of time since the last received control frame. At block 740, the example bitrate calculator 230 calculates the bitrate by dividing the bitmap from the control frame data by the amount of time since the last received control frame. At block 745, the example interval timer 220 determines if the timer has reached a threshold since the timer was started. In some examples, the threshold may be any length of time such as, for example, five minutes, fifteen minutes, etc. If the example interval timer 220 determines that the timer has reached a threshold since the timer was started (e.g., block 745 returns a result of YES), the example virtual bandwidth calculator 240 determines the average bitrate from the control frames received in the time period. (Block 750). If the example interval timer 220 determines that the timer has not reached a threshold since the timer was started (e.g., block 745 returns a result of NO), the example control frame receiver 210 waits to capture a new control frame (returns to block 715).

At block 750, the example virtual bandwidth calculator 240 determines the average bitrate from the control frames received in the time period. The example virtual bandwidth calculator 240 may determine the average bitrate from the control frames received by summing the bitrates of each control frame together and dividing by the total number of control frames received. However, other methods of determining an average may additionally and/or alternatively be used to determine the average bitrate of the control frames received. At block 755, the example virtual bandwidth calculator 240 divides the average bitrate by the time period. The example virtual bandwidth calculator 240 receives the time of the time period from the example interval timer 220 to perform the calculation of block 720.

At block 770, the example virtual bandwidth event generator 250 determines is the virtual bandwidth is greater than zero. If the example virtual bandwidth event generator 250 determines that the virtual bandwidth is not greater than zero (e.g., block 770 returns a result of NO), the example control frame receiver 210 waits to capture a new control frame (returns to block 715). If the example virtual bandwidth event generator 250 determines that the virtual bandwidth is greater than zero (e.g., block 760 returns a result of YES), the example virtual bandwidth event generator 250 generates a bandwidth event. (Block 760). Once the bandwidth event is generated, process 610 completes and returns to process 600 of FIG. 6. The example process 610 of FIG. 7 may be repeated over a selected period of time for virtual bandwidth detection.

Figure 8:
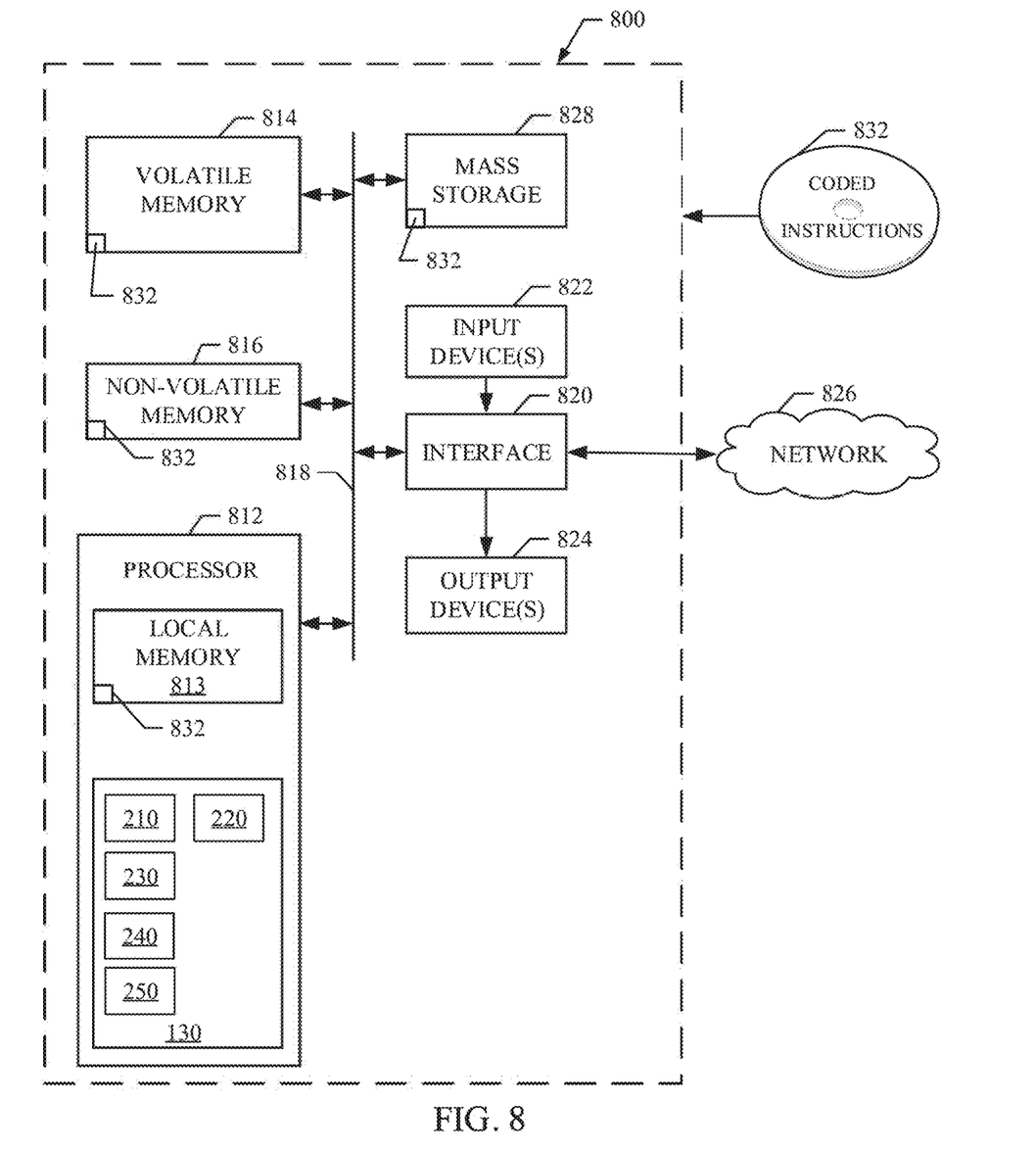
FIG. 8 is a block diagram of an example processing platform structured to execute the instructions of FIGS. 6 and 7 to implement the example the virtual bandwidth event detector of FIG. 2 to determine virtual bandwidth from block acknowledgment frames in accordance with teachings of this disclosure.

FIG. 8 is a block diagram of an example processor platform 800 structured to execute the instructions of FIGS. 6 and 7 to implement the virtual bandwidth event detector 125 of FIG. 2. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example control frame receiver 210, the example interval timer 220, the example bitrate calculator 230, the example virtual bandwidth calculator 240, and the example virtual bandwidth event generator 250.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 6 and 7 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that determine virtual bandwidths from control frame data. The disclosed methods, apparatus and articles of manufacture improve the efficiency of using a computing device by providing the ability to determine an estimated bandwidth for a user device without using information from the data frames. The disclosed methods, apparatus, and articles of manufacture improve the efficiency of using a computing device by using the block acknowledgment mechanism and not having to acknowledge every data packet since. The disclosed methods, apparatus, and articles of manufacture allow for determining bandwidth measurements in situations when a streaming meter device is unable to see data packets due to incompatible technology and/or other situations in which the streaming meter is unable to capture a data packet. The disclosed methods, apparatus and articles of manufacture are accordingly directed to one or more improvement(s) in the functioning of a computer.

Example methods, apparatus, systems, and articles of manufacture to determine virtual WiFi data rate are disclosed herein. Further examples and combinations thereof include the following:

Example 1 includes an apparatus to determine virtual bandwidth, the apparatus comprising a control frame receiver to capture control frames from a user device, a bitrate calculator to calculate a bitrate for each control frame by dividing a bitmap of a control frame by an amount of time between the control frame and a previously captured control frame, an interval timer to control a length of time that the control frames are captured before calculating the virtual bandwidth, and a virtual bandwidth calculator to calculate the virtual bandwidth after the length of time, the virtual bandwidth calculated by dividing an average bitrate from the control frames by the length of time.

Example 2 includes the apparatus of example 1, wherein the bitmap is a number of acknowledged frames between the control frame and the previously captured control frame.

Example 3 includes the apparatus of example 2, wherein the control frame receiver is to access at least one of a starting sequence number, a total time between the control frame and the previously captured control frame, the bitmap, and a total count of acknowledged frames during the length of time from the control frames.

Example 4 includes the apparatus of example 1, further including a virtual bandwidth event generator to generate a bandwidth event for the virtual bandwidth in response to the virtual bandwidth meeting a criterion.

Example 5 includes the apparatus of example 4, wherein the criterion represents the virtual bandwidth being greater than zero.

Example 6 includes At least one non-transitory computer readable medium comprising instructions that, when executed, cause at least one processor to at least capture control frames from a user device, calculate a bitrate for each control frame by dividing a bitmap of a control frame by an amount of time between the control frame and a previously captured control frame, control a length of time that the control frames are captured before calculating a virtual bandwidth, and calculate the virtual bandwidth after the length of time, the virtual bandwidth calculated by dividing an average bitrate from the control frames by the length of time.

Example 7 includes the at least one non-transitory computer readable medium of example 6, wherein the bitmap is a number of acknowledged frames between the control frame and the previously captured control frame.

Example 8 includes the at least one non-transitory computer readable medium of example 7, wherein the instructions that, when executed, cause the at least one processor to access at least one of a starting sequence number (SSN), a total time between the control frame and the previously captured control frame, the bitmap, and a total count of acknowledged frames during the length of time from the control frames.

Example 9 includes the at least one non-transitory computer readable medium of example 6, wherein the length of time may be five minutes.

Example 10 includes the at least one non-transitory computer readable medium of example 6, wherein the instructions, when executed, cause the at least one processor to generate a bandwidth event for the virtual bandwidth in response to the virtual bandwidth meeting a criterion.

Example 11 includes the at least one non-transitory computer readable medium of example 10, wherein the criterion represents the virtual bandwidth being greater than zero.

Example 12 includes a method to determine virtual bandwidth, the method comprising capturing control frames from a user device, calculating a bitrate for each control frame by dividing a bitmap of a control frame by an amount of time between the control frame and a previously captured control frame, controlling, by executing an instruction with a processor, a length of time that the control frames are captured before calculating the virtual bandwidth, and calculating the virtual bandwidth after the length of time, the virtual bandwidth calculated by dividing an average bitrate from the control frames by the length of time.

Example 13 includes the method of example 12, wherein the bitmap represents a number of acknowledged frames between the control frame and the previously captured control frame.

Example 14 includes the method of example 13, further including accessing at least one of a starting sequence number (SSN), a total time between the control frame and the previously captured control frame, the bitmap, and a total count of acknowledged frames during the length of time from the control frames.

Example 15 includes the method of example 12, wherein the length of time is substantially five minutes.

Example 16 includes the method of example 12, further including generating a bandwidth event for the virtual bandwidth if the virtual bandwidth meets a criterion.

Example 17 includes the method of example 16, wherein the criterion represents the virtual bandwidth being greater than zero.

Example 18 includes an apparatus to determine virtual bandwidth, the apparatus comprising means for capturing control frames from a user device, first means for calculating a bitrate for each control frame by dividing a bitmap of a control frame by an amount of time between the control frame and a previously captured control frame, means for controlling a length of time that the control frames are captured before calculating the virtual bandwidth, and second means for calculating the virtual bandwidth after the length of time, the virtual bandwidth calculated by dividing an average bitrate from the control frames by the length of time.

Example 19 includes the apparatus of example 18, wherein the bitmap is a number of acknowledged frames between the control frame and the previously captured control frame.

Example 20 includes the apparatus of example 18, wherein the means for capturing control frames from a user device is to access at least one of a starting sequence number, a total time between the control frame and the previously captured control frame, the bitmap, and a total count of acknowledged frames during the length of time from the control frames.

Example 21 includes the apparatus of example 18, further including means for generating a bandwidth event for the virtual bandwidth in response to the virtual bandwidth meeting a criterion.

Example 22 includes the apparatus of example 21, wherein the criterion represents the virtual bandwidth being greater than zero.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An audience measurement computing system, comprising:
   a processor;
   a memory having stored therein computer readable instructions that, when executed by the processor, cause the audience measurement computing system to perform operations comprising:
      accessing a set of device-specific bandwidth estimates for respective ones of a first plurality of networked media devices associated with a given household, wherein the device-specific bandwidth estimates are indicative of, for each device of the first plurality of networked media devices, calculated bandwidth values at respective ones of multiple times, wherein the calculated bandwidth value is based on multiple network acknowledgement messages sent by the device within the given household;
      making a streaming determination, based on the set of device-specific bandwidth estimates, that a first particular device of the first plurality of networked media devices associated with the given household is streaming media during a first particular time period; and
      responsive to making the streaming determination, crediting the first particular device with accessing streaming media during the first particular time period.

2. The audience measurement computing system of claim 1, wherein the operations further include:
   accessing media data that identifies media presented on the first particular device; and
   identifying, based on the media data, the streaming media credited with being accessed via the first particular device.

3. The audience measurement computing system of claim 1, wherein the operations further include:
   accessing device-identifying information corresponding to the first particular device; and
   associating the device-identifying information with the crediting.

4. The audience measurement computing system of claim 3, wherein the device-identifying information is a MAC address corresponding to the first particular device.

5. The audience measurement computing system of claim 1, wherein making the streaming determination includes comparing at least one bandwidth estimate of the set of device-specific bandwidth estimates with a threshold.

6. The audience measurement computing system of claim 1, wherein the calculated bandwidth value is determined by a meter device associated with the given household that accesses the multiple network acknowledgement messages via a household network associated with the given household.

7. The audience measurement computing system of claim 1, wherein the multiple network acknowledgement messages include at least two successive network acknowledgement messages, and wherein the calculated bandwidth value is determined based on a bitmap value of a second one of the at least two successive network acknowledgement messages and a time interval between the at least two successive network acknowledgement messages, wherein the bitmap value indicates a number of data frames acknowledged by the second one of the at least two successive network acknowledgement messages.

8. A method comprising:
   accessing a set of device-specific bandwidth estimates for respective ones of a first plurality of networked media devices associated with a given household, wherein the device-specific bandwidth estimates are indicative of, for each device of the first plurality of networked media devices, calculated bandwidth values at respective ones of multiple times, wherein the calculated bandwidth value is based on multiple network acknowledgement messages sent by the device within the given household;
   making a streaming determination, based on the set of device-specific bandwidth estimates, that a first particular device of the first plurality of networked media devices associated with the given household is streaming media during a first particular time period; and
   responsive to making the streaming determination, crediting the first particular device with accessing streaming media during the first particular time period.

9. The method of claim 8, further including:
   accessing media data that identifies media presented on the first particular device; and
   identifying, based on the media data, the streaming media credited with being accessed via the first particular device.

10. The method of claim 8, further including:
    accessing device-identifying information corresponding to the first particular device; and
    associating the device-identifying information with the crediting.

11. The method of claim 10, wherein the device-identifying information is a MAC address corresponding to the first particular device.

12. The method of claim 8, wherein making the streaming determination includes comparing at least one bandwidth estimate of the set of device-specific bandwidth estimates with a threshold.

13. The method of claim 8, wherein the calculated bandwidth value is determined by a meter device associated with the given household that accesses the multiple network acknowledgement messages via a household network associated with the given household.

14. The method of claim 8, wherein the multiple network acknowledgement messages include at least two successive network acknowledgement messages, and wherein the calculated bandwidth value is determined based on a bitmap value of a second one of the at least two successive network acknowledgement messages and a time interval between the at least two successive network acknowledgement messages, wherein the bitmap value indicates a number of data frames acknowledged by the second one of the at least two successive network acknowledgement messages.

15. A non-transitory computer readable medium having stored therein machine readable instructions that, when executed by a processor, cause performance of operations comprising:
   accessing a set of device-specific bandwidth estimates for respective ones of a first plurality of networked media devices associated with a given household, wherein the device-specific bandwidth estimates are indicative of, for each device of the first plurality of networked media devices, calculated bandwidth values at respective ones of multiple times, wherein the calculated bandwidth value is based on multiple network acknowledgement messages sent by the device within the given household;
   making a streaming determination, based on the set of device-specific bandwidth estimates, that a first particular device of the first plurality of networked media devices associated with the given household is streaming media during a first particular time period; and
   responsive to making the streaming determination, crediting the first particular device with accessing streaming media during the first particular time period.

16. The non-transitory computer readable medium of claim 15, wherein the operations further include:
   accessing media data that identifies media presented on the first particular device; and
   identifying, based on the media data, the streaming media credited with being accessed via the first particular device.

17. The non-transitory computer readable medium of claim 15, wherein the operations further include:
   accessing device-identifying information corresponding to the first particular device; and
   associating the device-identifying information with the crediting.

18. The non-transitory computer readable medium of claim 15, wherein making the streaming determination includes comparing at least one bandwidth estimate of the set of device-specific bandwidth estimates with a threshold.

19. The non-transitory computer readable medium of claim 15, wherein the calculated bandwidth value is determined by a meter device associated with the given household that accesses the multiple network acknowledgement messages via a household network associated with the given household.

20. The non-transitory computer readable medium of claim 15, wherein the multiple network acknowledgement messages include at least two successive network acknowledgement messages, and wherein the calculated bandwidth value is determined based on a bitmap value of a second one of the at least two successive network acknowledgement messages and a time interval between the at least two successive network acknowledgement messages, wherein the bitmap value indicates a number of data frames acknowledged by the second one of the at least two successive network acknowledgement messages.

* * * * *